United States Patent [19]

Ishiwata

[11] Patent Number: 4,686,643
[45] Date of Patent: Aug. 11, 1987

[54] ELECTRONIC EQUIPMENT SELECTIVELY STORING A FREQUENTLY USED CONVERSION FUNCTION

[76] Inventor: Junichi Ishiwata, c/o Canon Kabushiki Kaisha, 30-2, 3-chome, Shimomaruko, Ohta-ku, Tokyo, Japan

[21] Appl. No.: 750,986

[22] Filed: Jul. 1, 1985

Related U.S. Application Data

[63] Continuation of Ser. No. 416,053, Sep. 8, 1982, abandoned.

[30] Foreign Application Priority Data

Sep. 16, 1981 [JP] Japan .................................. 56-146934

[51] Int. Cl.⁴ ................................................ G06F 5/00
[52] U.S. Cl. ..................................... 364/715; 235/310
[58] Field of Search ................. 364/715, 709; 235/310

[56] References Cited

U.S. PATENT DOCUMENTS

| | | | |
|---|---|---|---|
| 4,001,569 | 1/1977 | Dickinson et al. | 364/715 |
| 4,081,859 | 3/1978 | Goldsamt et al. | 364/709 |
| 4,092,523 | 5/1978 | Tava et al. | 235/310 |
| 4,217,653 | 8/1980 | Nakata | 364/715 |
| 4,290,113 | 9/1981 | Haker et al. | 364/709 |

*Primary Examiner*—David H. Malzahn
*Attorney, Agent, or Firm*—Fitzpatrick, Cella, Harper & Scinto

[57] ABSTRACT

An electronic desk-top calculator with a unit conversion function comprises an input key for inputting a type of unit conversion, an execution unit for executing unit conversion, a first memory for storing a conversion rate for the unit conversion and a second memory for storing the type of unit conversion. The execution unit carries out the unit conversion based on the conversion rate stored in the first memory and the type of unit conversion stored in the second memory.

8 Claims, 11 Drawing Figures

| NO | KEY OPERATION | INDICATION |
|---|---|---|
| 1 | 2 | 2. |
| 2 | → | 2. |
| 3 | 7(in⇌cm) | 5.08 |
| 4 | 3 | 3. |
| 5 | → | 3. |
| 6 | 7(in⇌cm) | 7.62 |
| 7 | 2.54 | 2.54 |
| 8 | ← | 2.54 |
| 9 | 7(in⇌cm) | 1. |
| 10 | 2 x 3 = | 6. |
| 11 | 4 | 4. |
| 12 | → | 4. |
| 13 | 7(in⇌cm) | 10.16 |
| 14 | 5 | 5. |
| 15 | → | 5. |
| 16 | 7(in⇌cm) | 12.7 |

FIG. 3A

| NO | KEY OPERATION | INDICATION | |
|---|---|---|---|
| 1 | 2 | | 2. |
| 2 | → | | 2. |
| 3 | %±(CS) | | 2. |
| 4 | 7 (in⇌cm) | c | 5.08 |
| 5 | 3 | c | 3. |
| 6 | → | c | 7.62 |
| 7 | 2.54 | c | 2.54 |
| 8 | ← | c | 1. |
| 9 | 2×3= | c | 6. |
| 10 | 4 | c | 4. |
| 11 | → | c | 10.16 |
| 12 | 5 | c | 5. |
| 13 | → | c | 12.7 |

FIG. 3B

| NO | KEY OPERATION | INDICATION | |
|---|---|---|---|
| 1 | CI/C | c | 0. |
| 2 | → | c | 0. |
| 3 | M≡(CR) | | 0. |
| 4 | 1 | | 1. |
| 5 | → | | 1. |
| 6 | 8(ft⇌m) | | 0.303 |

ELECTRONIC EQUIPMENT SELECTIVELY STORING A FREQUENTLY USED CONVERSION FUNCTION

This application is a continuation of application Ser. No. 416,053, filed Sept. 8, 1982, now abandoned.

BACKGROUND OF THE INVENTION

1. Field of the Invention

The present invention relates to an improvement in an electronic desk-top calculator having a unit conversion function, and more particularly to an electronic desk-top calculator with a unit conversion function (hereinafter referred to as a unit conversion desk-top calculator) which selects a type of conversion having a highest frequency of usage from a plurality of types of conversion and stores it so that the conversion in accordance with the stored type of conversion is carried out by merely actuating a key for specifying a direction of conversion.

2. Description of the Prior Art

Figure 1:
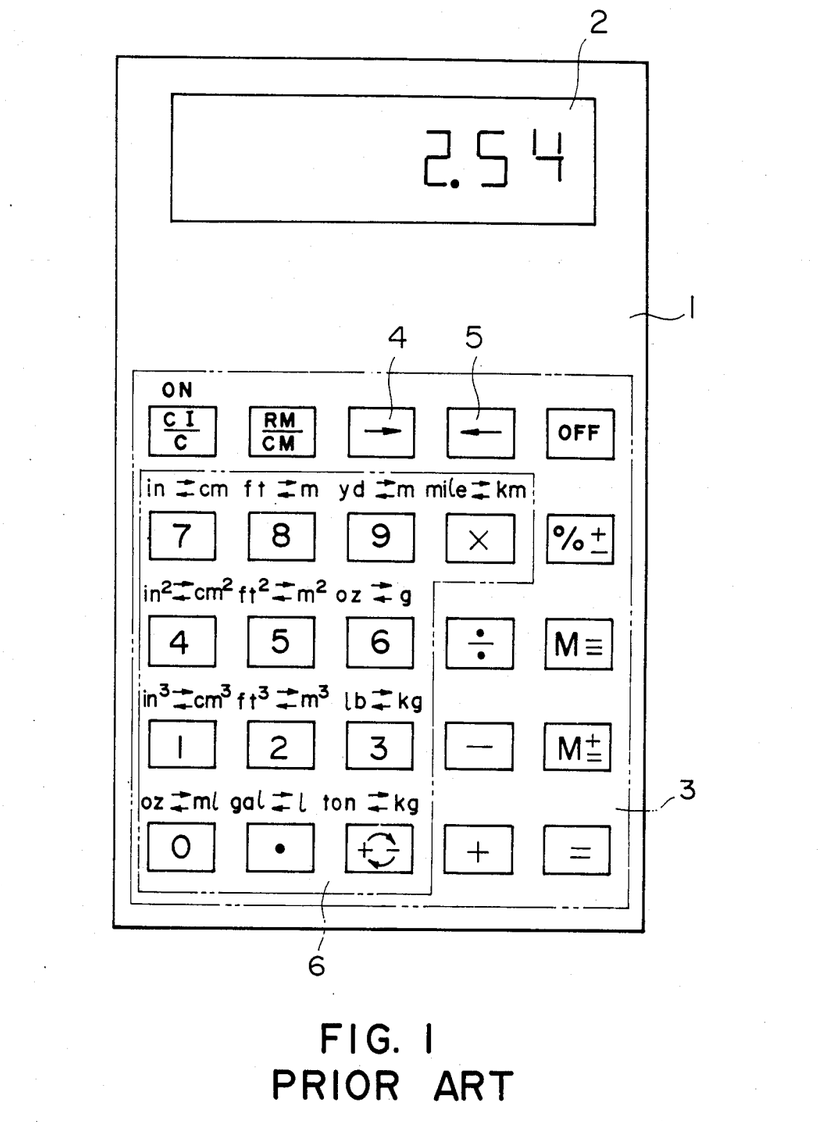
FIG. 1 shows an external view of a prior art unit conversion desk-top calculator.

FIG. 1 shows an external view of a prior art unit conversion desk-top calculator. Numeric data is entered by numeric keys on a keyboard 3 and calculated by instructions entered by operation instruction keys. A conversion direction specifying key 4 or 5 is depressed to specify the direction of conversion, rightward or leftward, that is, from the foot/pound system to the metric system or vice versa in the example shown in FIG. 1. Then, a desired type of conversion is selected by depressing one of conversion keys 6, which also serve as the numeric keys or the function keys, to carry out the desired conversion. For example in order to convert 2 inches to centimeters the prior art unit conversion desk-top calculator needs the following keying operations.

Figure 3A:
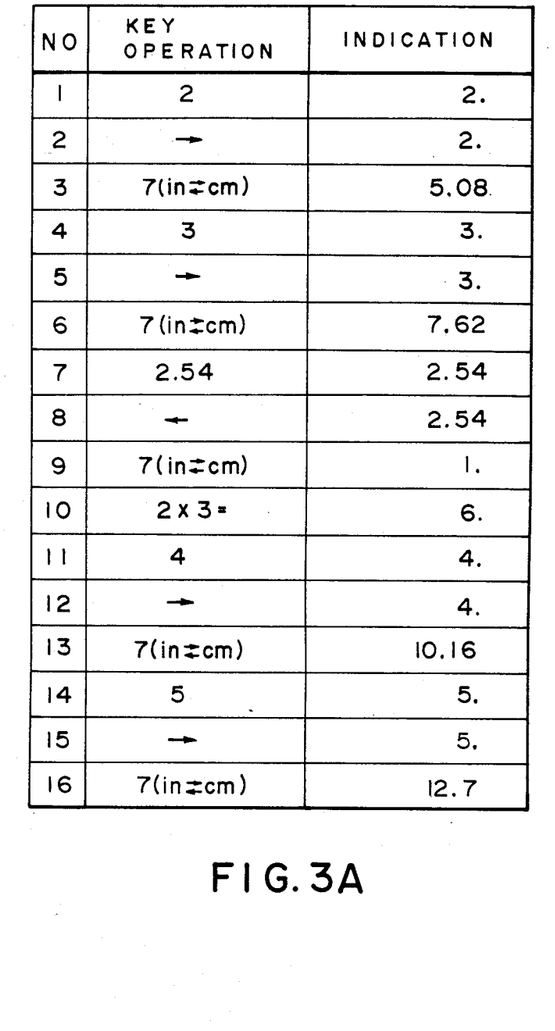
FIG. 3A shows an operation sequence of the prior art desk-top calculator.

FIG. 3A shows the keying sequence. In a step 1, a numerical value "2" to be converted is entered. It represents 2 inches and it is to be converted to centimeters. In a step 2, the right conversion key "→" is depressed to specify the conversion from the foot/pound system to the metric system. Since the conversion desired is the inch to cm conversion, a numeric key 7 is depressed in the step 3.

As a result, an arithmetic operation control circuit in a main body carries out a multiplication operation to multiply the entered numerical value by 2.54 which is the conversion rate for the inch to cm conversion (1 inch = 2.54 cm) under the control of a program stored in a ROM and display a result 5.08.

In this manner, the inch to cm unit conversion process is carried out. As shown in the steps following step 3 of FIG. 3A, when only the numerical value to be converted is changed, for example, when 3 inches is to be converted to centimeters, numerical value "3" is entered in a step 4, the right conversion key "→" is depressed in a step 5 and the key 7 is depressed in a step 6. Thus, the entered numerical value "3" is multiplied by 2.54 and a result 7.62 is displayed, in the same manner as the steps 1 to 3. When it is desired to convert 2.54 cm to inches, that is, an opposite direction convertion is desired, a numerical value "2.54" is entered in a step 7, a left conversion key "←" is depressed in a step 8 and the key 7 which is the inch to cm conversion key is depressed in a step 9. Thus, the arithmetic operation control circuit issues an instruction to divide the entered numerical value by the conversion rate 2.54 and displays a result 1. In a step 10, an ordinary multiplication operation of 2×3=6 is carried out. In steps 11–13 and steps 14–16, 4 inches and 5 inches, respectively, are converted to centimeters.

As seen from FIG. 3A, in the prior art keying sequence, three steps of keying, that is, entering of the numerical value, specification of the conversion direction and specification of the type of conversion are needed for each conversion operation. When an operator repeatedly carries out the conversion operation of the same type, the same keying sequence must be repeated. Consequently, the efficiency of operation is very poor.

SUMMARY OF THE INVENTION

It is an object of the present invention to provide an electronic equipment with a unit conversion function which can reduce the number of keying operations.

It is another object of the present invention to provide electronic equipment with a unit conversion function which stores a type of conversion and carries out the unit conversion operation by referring to the stored type of conversion.

It is a further object of the present invention to provide electronic equipment with a unit conversion function which, when the same type of conversion is to be repeatedly carried out, stores the type of conversion at the first conversion operation and carries out the subsequent conversion operations in accoardance with the keying operations of the conversion direction specifying keys until the stored type of conversion operation is cleared so that the keying operations are simplified and the operability is improved.

The other objects of the present invention will be apparent from the following description of the preferred embodiments taken in conjunction with the accompanying drawings.

DETAILED DESCRIPTION OF THE PREFERRED EMBODIMENTS

Figure 2:
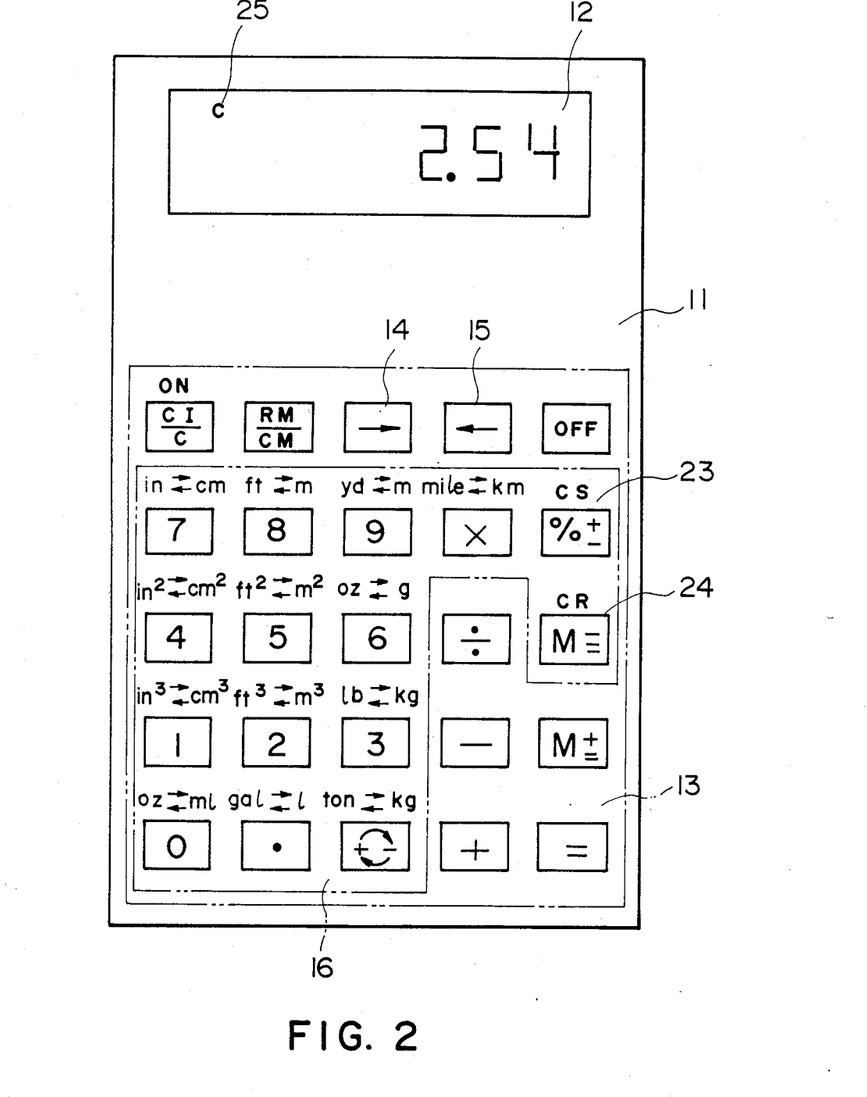
FIG. 2 shows an external view of one embodiment of a unit conversion desk-top calculator of the present invention.
Figure 3B:
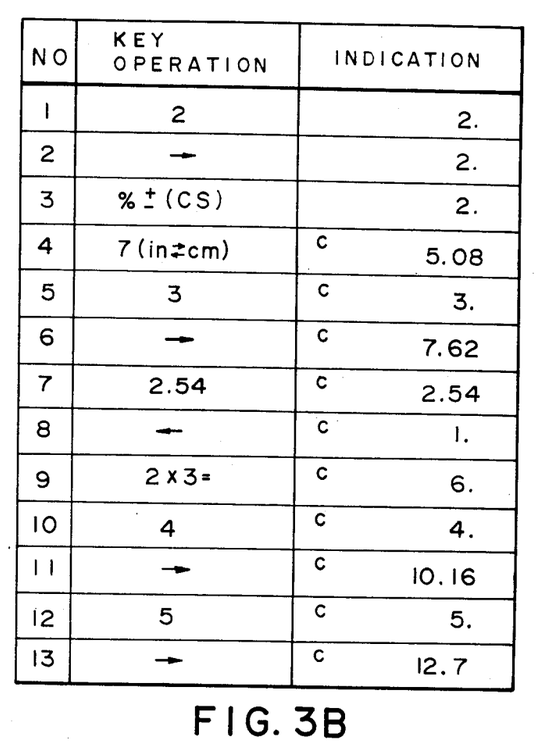
FIGS. 3B and 3C show operation sequences of the desk-top calculator of the present invention.
Figure 3C:
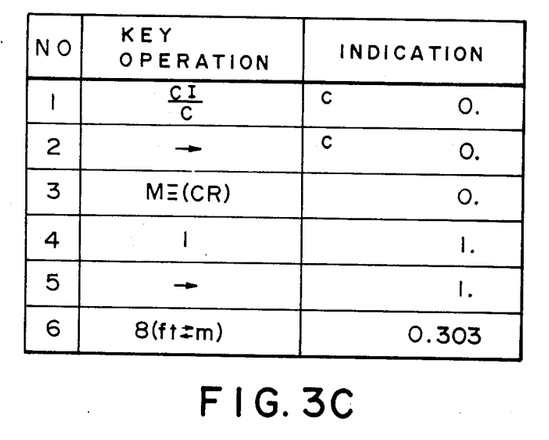
Figure 4:
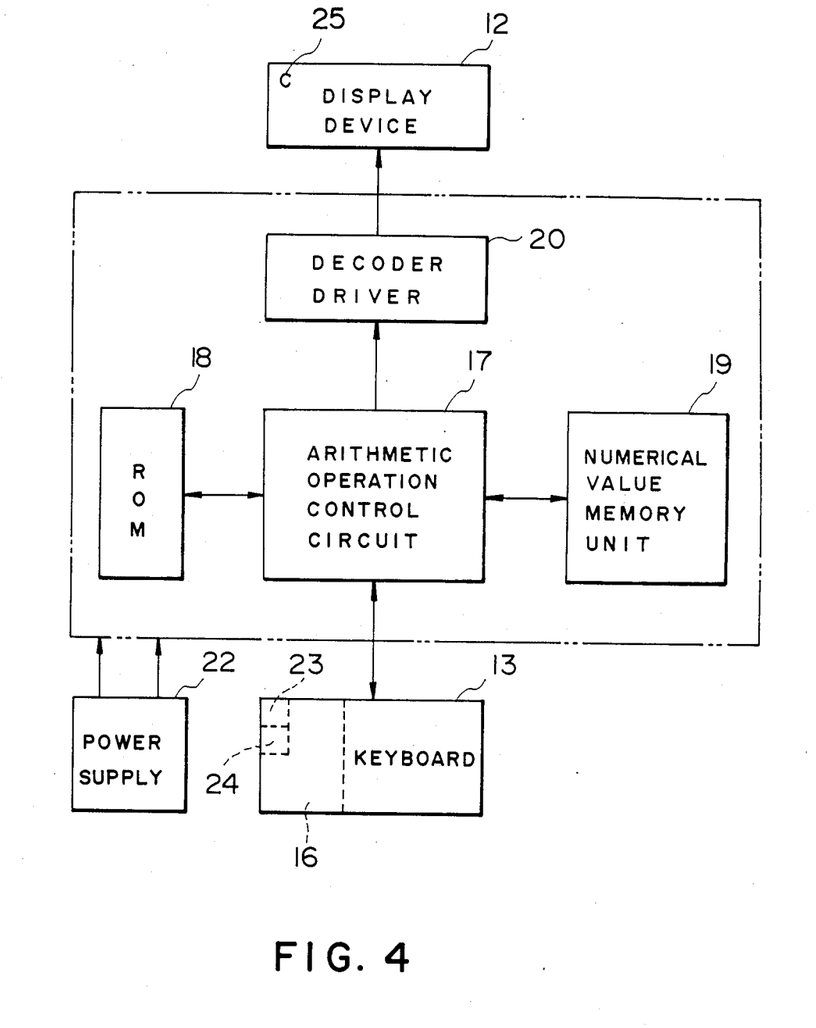
FIG. 4 shows a block diagram of a configuration of the desk-top calculator of FIG. 2.

FIG. 2 shows an external view of one embodiment of a unit conversion desk-top calculator of the present invention, and FIG. 4 shows a block diagram of a configuration thereof. The basic operation system and the conversion keys are identical to those of the prior art unit conversion desk-top calculator shown in FIG. 1. A conversion memory set key (CS) 23, a conversion memory reset key (CR) 24 and a conversion memory mode display mark 25 on a display 12 are newly added. Specific operations and display status are shown in FIGS. 3B and 3C with respect to the keying operations.

Referring to FIGS. 2 and 4, a configuration of the one embodiment of the present invention is explained. Numeral 11 denotes a main body of the unit conversion desk-top calculator. Numeral 12 denotes a display which displays entered data, an operation result and a symbol representing unit conversion information. Numeral 13 denotes a keyboard having keys arranged as shown. Numerals 14 and 15 denote keys for specifying the directions of conversion. Numeral 16 denotes a key which can instruct one of two input operations selected by the depression or non-depression of the key 14 or 15. The keys 23 and 24 control the store of the information on the unit conversion as described above. Numeral 25 denotes the symbol described above.

A circuit which is operated by the actuation of the keys on the keyboard 13 is now explained. FIG. 4 shows a block diagram of the circuit. Numeral 12 denotes the display 12 described above and numeral 13 denotes the keyboard 13 described above. Numerals 16, 23 and 24 correspond to the keys 16, 23 and 24 shown in FIG. 2. Numeral 17 denotes an arithmetic operation control circuit which executes a program stored in a read-only memory (ROM) to process the data and control the operation. Numeral 18 denotes the ROM descirbed above which stores the program to carry out a sequence to be described later. Numeral 19 denotes a numerical data memory which stores a numerical value entered from the keyboard 13, the conversion information and a signal representing the symbol 25. Numeral 20 denotes a decoder driver which decodes a content read from the numerical data memory 19 to display it on the display 12.

The operation of the present embodiment is now explained.

The numerical data and the operation instruction entered by the keyboard 13 are processed by the arithmetic operation control circuit 21 in accordance with the program stored in the ROM 18 and an operation result is stored in the numerical data memory 19 and supplied to the display 12 through the display driver 20 to inform the numerical data to an operator. The input numerical value or the operation result is multiplied by or divided by a conversion rate stored in the ROM 18 to produce a converted result.

When the operator wants to repeatedly carry out the inch to centimeter conversion, for example, when the calculations shown in FIG. 3A are to be carried out by the unit conversion desk-top calculator of the present invention, it is carried out as shown in FIG. 3B. In step 1, a numerical value "2" is entered, and the right conversion is specified by depressing the right conversion key 14 in step 14. In step 3, the conversion memory set key 23 of the present invention is depressed. CS is set as a back key of a key "% ±" by the key 14 or 15. By depressing the key 23, the type of conversion specified by subsequently depressing one of the conversion keys, the inch to centimeter key to be depressed in step 4 in the example FIG. 3B, is stored in the numerical data memory 19 of FIG. 4. The symbol "C" of the conversion memory mode display symbol 25 is stored in the numerical data memory 19 and displayed on the display 12. The symbol "C" is held until the conversion memory is reset. The left conversion specifying key 15 may be depressed in step 2. In step 5, a numerical value "3" is entered, and the right conversion specifying key "→" is depressed in a step 6. Thus, the arithmetic operation control circuit 17 instructs to carry out the inch to centimeter conversion stored in the numeric data memory 19 in the right direction, that is, inch to centimeter conversion, and reads out a conversion rate 2.54 from the ROM and multiplies the entered numeric data "3" by 2.54 to produce a product 7.62. This operation is carried out because the input CS is stored. In step 7, a numerical value "2.54" is entered and the left conversion specifying key "←" 15 is depressed in step 8 to specify centimeter to inch conversion. Thus, the arithmetic operation control circuit 17 instructs to carry out the inch to centimeter conversion stored in the numerical data memory 19 in the left direction, that is, centimeter to inch conversion and divides the entered numerical value "2.54" by the conversion rate 2.54 to produce a quotient 1. In step 9, an ordinary calculation is carried out. In step 10, a numerical value "4" is entered, and the right conversion key "→" is depressed in step 11. Thus, the operation of 4×2.54 is carried out and the product 10.16 is displayed. In step 12, a numerical value "5" is entered, and the right conversion key "→" is depressed in step 13. Thus, the operation of 5×2.54 is carried out and the product 12.7 is displayed.

FIG. 3C shows a sequence for releasing the conversion memory mode. In step 1, the key "CI/C" is depressed, in step 2, the conversion direction specifying key "→" 14 is depressed, and in step 3, the conversion memory reset key 24 is depressed. Thus, the memory is cleared and the conversion memory mode display disappears to release the conversion memory. As a result, an ordinary mode is restored in steps 4 to 6 to permit another conversion operation.

In accordance with the present invention, when the same type of conversion operation is to be repeatedly carried out, the conversion memory mode is set so that the subsequent conversion operations can be carried out with one step less than the sequence of the prior art unit conversion desk-top calculator, and the operations are carried out in a one-touch manner after entering the numeric value. When the conversion operation is carried out five times as shown in FIGS. 3A and 3B, three keying operation can be saved, and when the same type of conversion operation is repeatedly carried out a greater number of times, the number of keying operations is reduced approximately ⅔ to compared with the sequence of a prior art desk-top calculator. Accordingly, the conversion operation can be carried out in a very efficient manner.

In a memory hold type desk-top calculator in which the data in the numerical memory 9 is held after a power is turned off by a touch-key type key "OFF" shown in FIG. 2, the function is held after the power-off. Thus, when the conversion memory mode is set, the desk-top calculator can be used as a specific unit conversion desk-top calculator if an operator needs only one type of conversion.

Figure 5:
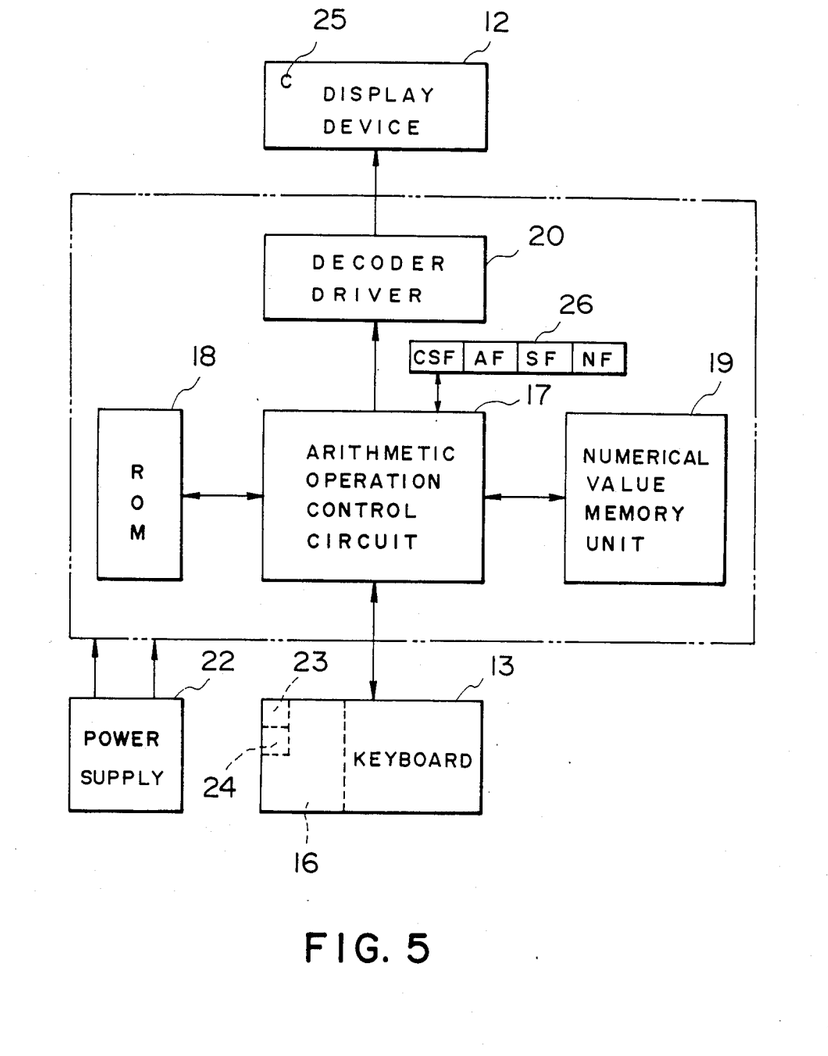
FIG. 5 shows a block diagram of another embodiment of the present invention.

FIG. 5 shows a block diagram of another embodiment of the present invention. The like elements to those of the first embodiment are designated by like numerals, and only different elements are designated by new numerals. Numeral 26 denotes a flag register having flags CSF, AF, SF and NF. CSF is a conversion flag which is set to "1" when CS is entered from the key 23 and reset to "0" when CR is entered from the key 24. AF is a direction flag which stores information (which may be a key code) representing the depressed one of the direction keys 14 and 15. SF is a second flag which indicates instruction to be entered when the key 16 is depressed. When SF is "1", the unit conversion CS or CR is entered, and when SF is "0" other instruction is entered. The flag SF may be substituted by the flag AF. NF is a numeric flag which is set when the numeric key is depressed. The ROM 18 stores a control sequence as shown in FIG. 6.

The operation of this embodiment is as follows.

When the power is turned on, the following control sequence is executed by the program stored in the ROM 18.

Figure 6A:
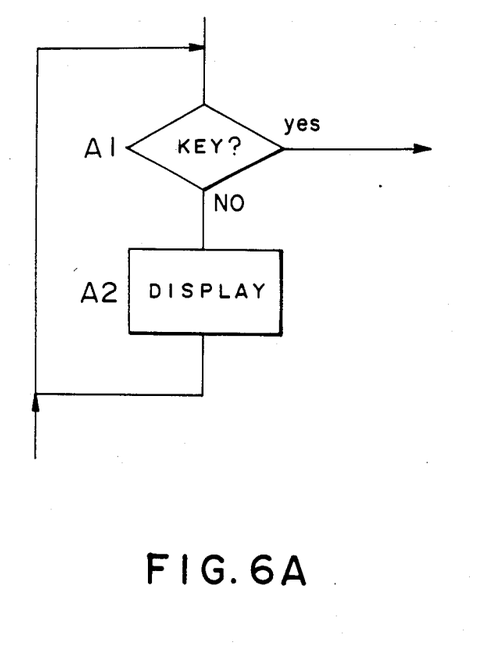
FIGS. 6A, 6B, 6C and 6D show flow charts for explaining the operation of the other embodiment of the present invention.

Referring to FIG. 6A, the arithmetic operation control circuit 17 checks if the key has been depressed in step A1. If the decision is NO, the process goes to step A2 where the data to be displayed stored in the numerical data memory 19 is supplied to the display 12 through the decoder driver 20 to display it. If the decision in the step A1 is YES, the control circuit 17 determines the particular key depressed. If it is the numeric key, the numerical value is stored in the numerical data memory 19 and the numeric flag NF is set to "1". It is assumed that the flag SF is "0" at this step. When the key 14 is depressed as shown in step 2 of FIG. 3B, the flag NF is checked in step B1 of FIG. 6B. Since the decision is YES, the flag CSF is checked in step B2. The decision is NO and the process goes to step B3 where it is checked if the key 14 has been depressed. Since the decision is YES, the process goes to step B4 where "→" is set in the flag AF. If the decision is NO, "←" is set in the flag AF in step B5. Then, the process goes to step B6 where the flag SF is set to "1" and the process of FIG. 6A is carried out.

Figure 6B:
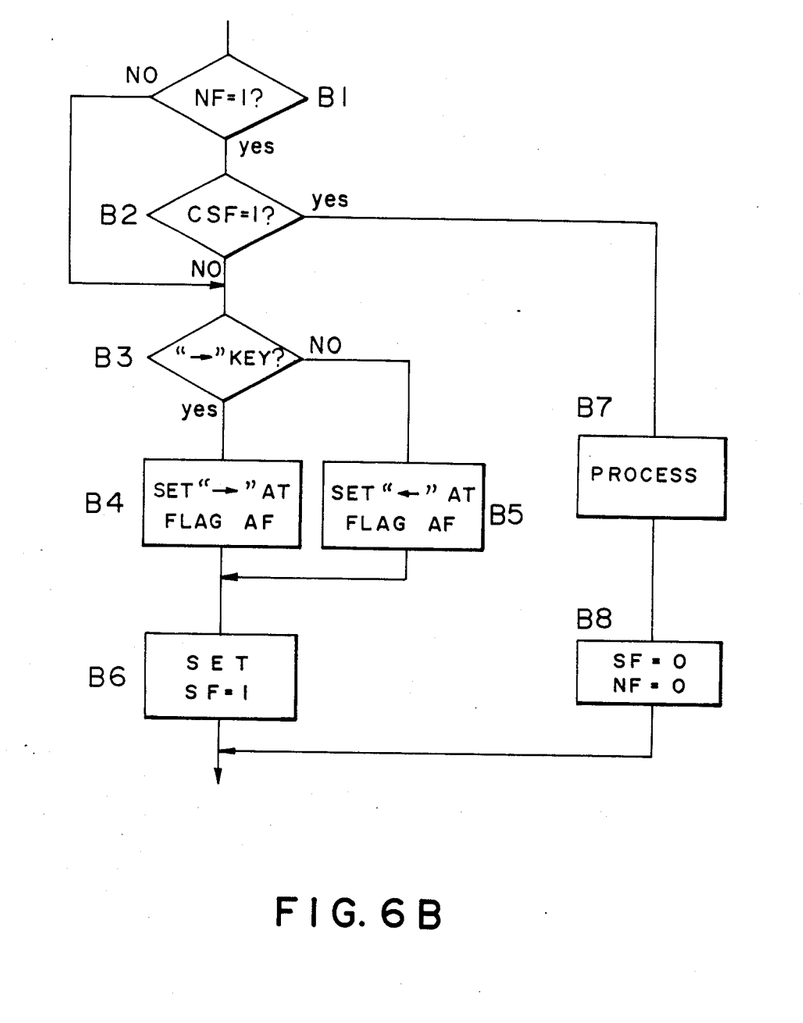
Figure 6C:
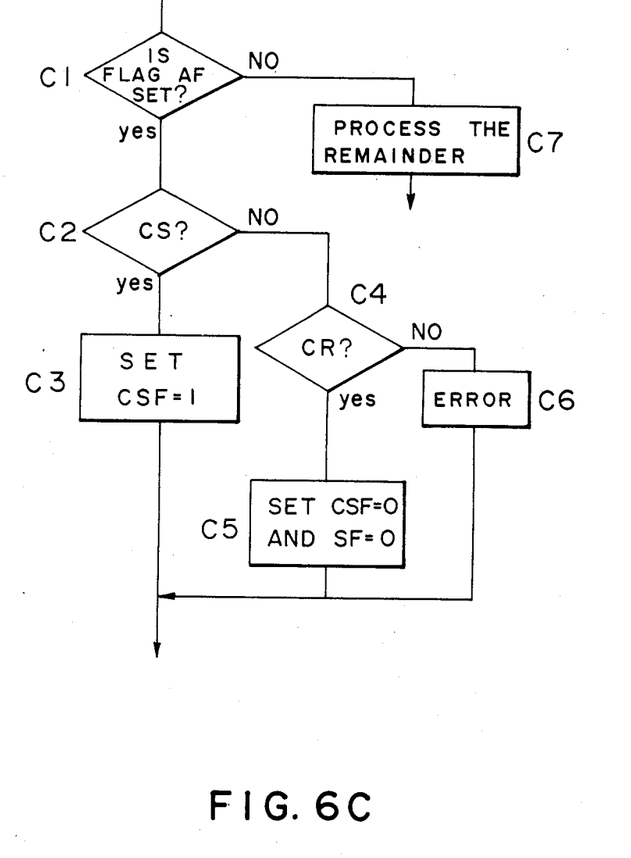
Figure 6D:
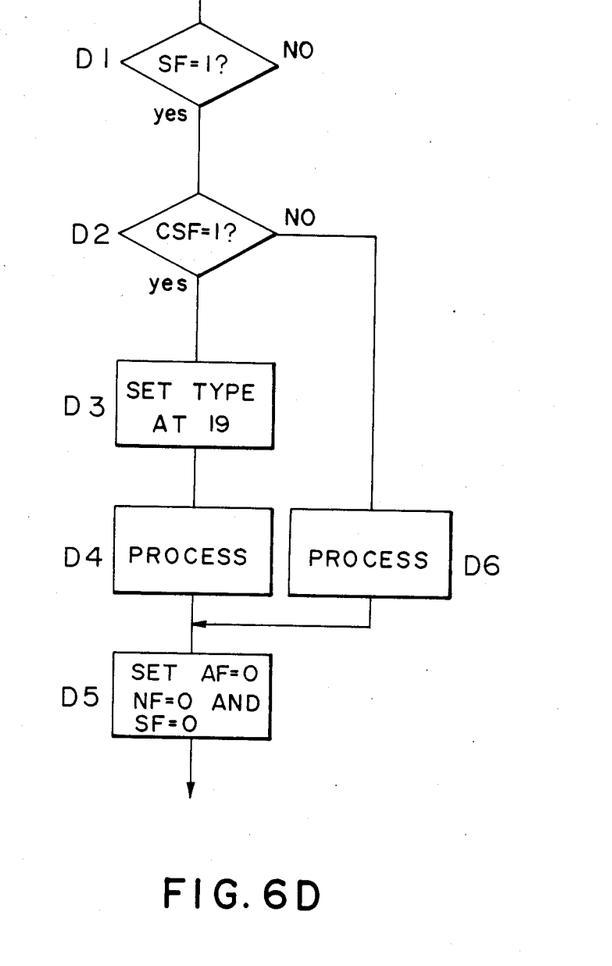

When the key "% ±" (CS) 23 is depressed in step 3 of FIG. 3B, a control sequence shown in FIG. 6C is executed. It is carried out through FIG. 6A. In step C1, the set status of the flag AF is checked. Since it is set in the present example, the decision is YES and the process goes to step C2 where it is checked if the key 23 has been depressed. Since the decision is YES, the process goes to step C3 where the flag CSF is set to "1". Then, the process of FIG. 6A is executed. When the keying operation of step 4 in FIG. 3B is carried out, the process is shifted to FIG. 6D through FIG. 6A and steps D1 and D2 are carried out. Since CSF is "1", the process goes to a step D3 where inch to centimeter information is stored in the numerical data memory 19. Then, in a step D4, the unit conversion operation is carried out and in a step D5, the flags SF, NF and AF are reset to "0" and the process is shifted to FIG. 6A. When the keying operations of steps 5 and 6 of FIG. 3B are carried out, the input data are processed in the manner described above. When the keying operations of steps 2, 3, 4, 5 and 6 are then carried out to convert 1 foot to meters as shown in steps 4 through 6 of FIG. 3C, the following sequence is carried out.

The decision in step B1 of FIG. 6B is NO because of the keying operation of step 2 in FIG. 3C. Thus, the process jumps to step B3. Since the key 14 has been depressed the corresponding information is set in the flag AF in step B4. Then, the flag SF is set to "1" in step B6. When the key 24 is then depressed, the process goes through steps C1, C2 and C4 to step C5 where the flags CSF and SF are reset to "0".

When the numeric key is next depressed, the flag NF is set to "1" and the numerical value is stored in the numerical data memory 19. When the key 14 is then depressed, the process goes through steps B1, B2, B3, B4 and B6 of FIG. 6B to FIG. 6A. When the "8" key is depressed, indicating conversion from feet to meters, in step 8, the process is shifted from FIG. 6A to FIG. 6D and goes through the steps D1 and D2 to the step D6 where the data 1 is processed based on the type of conversion entered from the key, the direction of conversion entered from the key 14 and the conversion rate read from the ROM 18 to produce a result 0.303. In step D5, the flags AF, NF and SF are reset to "0" and the process returns to FIG. 6A.

What I claim is:

1. Electronic equipment with a unit conversion function, comprising:

input means having key means for selectively inputting a type of unit conversion and numerical information;

first memory means for storing a conversion rate for the type of unit conversion input by said input means;

second memory means for storing a type of unit conversion input by said input means;

conversion memory set means for loading the type of unit conversion input by said input means in said second memory means; and instruction means, responsive to actuation of said key means and in cooperation with said first and second memory means, for repeatedly executing the type of unit conversion stored in said second memory means on numerical information repeatedly input by said input means on the basis of the conversion rate stored in said first memory means when said conversion memory set means has stored a type of unit conversion in said second memory means from a previously executed conversion and the conversion rate stored in said first memory means.

2. Electronic equipment with a unit conversion function according to claim 1 further comprising means for clearing the type of unit conversion stored in said second memory means.

3. Electronic equipment with a unit conversion function according to claim 1 further including means for replacing the type of unit conversion stored in said second memory means with another type of unit converion.

4. Electronic equipment with a unit conversion function according to claim 1 further comprising indication means for indicating when a type of unit conversion is stored in said second memory means.

5. Electronic equipment with a unit conversion function according to claim 1 wherein said second memory means includes a memory for storing information representing different types of unit conversion.

6. Electronic equipment with a unit conversion function, comprising:

first memory means for storing various conversion rates for unit conversion;

input means having key means for specifying a direction of unit conversion and means for inputting numerical information;

second memory means for storing a type of unit conversion; and means responsive to actuation of said key means for executing unit conversion of numerical information input by said input means for inputting by referring to the direction of unit conversion specified by said key means, the type of unit conversion stored in said second memory means from a previously executed unit conversion and a conversion rate stored in said first memory means.

7. Electronic equipment with a unit conversion function according to claim 6 wherein said second memory means is a readable/writable memory.

8. Electronic equipment with a unit conversion function, comprising:

input means having key means for selectively inputting a type of unit conversion and numerical information;

first memory means for storing a conversion rate for the type of unit conversion input by said input means, wherein said first memory means is a read-only memory;

second memory means for storing a type of unit conversion input by said input means, wherein said second memory means is a readable/writable memory;

conversion memory set means for loading the type of unit conversion input by said input means in said second memory means; and instruction means, responsive to actuation of said key means and in cooperation with said first and second memory means, for repeatedly executing the type of unit conversion stored in said second memory means on numerical information repeatedly input by said input means on the basis of the conversion rate stored in said first memory means when said conversion memory set means has stored a type of unit conversion in said memory means.

* * * * *

UNITED STATES PATENT AND TRADEMARK OFFICE
CERTIFICATE OF CORRECTION

PATENT NO. : 4,686,643

DATED : August 11, 1987

INVENTOR(S) : JUNICHI ISHIWATA

It is certified that error appears in the above-identified patent and that said Letters Patent is hereby corrected as shown below:

On the title page Insert

-- [73]   Assignee: Canon Kabushiki Kaisha,
                    Tokyo, Japan--.

COLUMN 1

Line 16, "calculator)which" should read --calculator) which--.
    Line 16, "having a" should read --having the--.
    Line 44, "cm" should read --centimeter--.
    Line 49, "cm" should read --centimeter--.
    Line 52, "cm" should read --centimeter--.
    Line 65, "cm" should read --centimeter--.

COLUMN 2

Line 16, "provide an" should read --provide--.
    Line 29, "accoardance" should read --accordance--.

UNITED STATES PATENT AND TRADEMARK OFFICE
CERTIFICATE OF CORRECTION

PATENT NO. : 4,686,643

DATED : August 11, 1987

INVENTOR(S) : JUNICHI ISHIWATA

It is certified that error appears in the above-identified patent and that said Letters Patent is hereby corrected as shown below:

COLUMN 3

Line 26, "descirbed" should read --described--.
    Line 54, "14 in step 14" should be deleted.
    Line 68, "a" should be deleted.

COLUMN 4

Line 45, "reduced" should read --reduced to--.
    Line 45, "to" should be deleted.

COLUMN 6

Line 42, "verion." should read --version.--.

Signed and Sealed this

Twenty-fifth Day of October, 1988

Attest:

DONALD J. QUIGG

Attesting Officer      Commissioner of Patents and Trademarks